United States Patent
Shin et al.

(10) Patent No.: US 7,923,955 B2
(45) Date of Patent: Apr. 12, 2011

(54) METHOD AND APPARATUS FOR CONTROLLING AN ACTIVE ENGINE MOUNT

(75) Inventors: Kwang-Keun Shin, Rochester Hills, MI (US); David J. Verbrugge, Milford, MI (US); Robert W. Leschuk, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1652 days.

(21) Appl. No.: 11/196,516

(22) Filed: Aug. 3, 2005

(65) Prior Publication Data

US 2007/0029713 A1   Feb. 8, 2007

(51) Int. Cl.
    *G05B 5/01* (2006.01)
    *F16F 7/00* (2006.01)
(52) U.S. Cl. ............ 318/611; 318/523; 318/400.28; 318/400.29; 267/140.15; 267/141
(58) Field of Classification Search .......... 318/254, 318/293, 280–286, 432, 609, 610, 630, 400.26, 318/560, 400.28, 400.29, 611, 623; 363/17, 363/98; 180/446; 701/37–39; 280/5.5; 267/140.15, 267/141
See application file for complete search history.

(56) References Cited

U.S. PATENT DOCUMENTS

| | | | | |
|---|---|---|---|---|
| 4,755,728 A * | 7/1988 | Ban | ................ | 318/400.26 |
| 5,023,493 A | 6/1991 | Wrzesinski | | |
| 5,574,344 A * | 11/1996 | Matsuoka et al. | ............ | 318/293 |
| 5,596,252 A * | 1/1997 | Shimizu et al. | ............ | 318/432 |
| 5,917,720 A | 6/1999 | Galbiati | | |
| 6,066,930 A * | 5/2000 | Horiguchi et al. | ....... | 318/400.29 |
| 6,364,294 B1 | 4/2002 | Gennesseaux | | |
| 6,384,556 B1 * | 5/2002 | Mizumoto et al. | ............ | 318/293 |
| 6,477,413 B1 | 11/2002 | Sullivan | | |
| 6,580,244 B2 * | 6/2003 | Tanaka et al. | ................ | 318/560 |
| 6,678,177 B2 * | 1/2004 | Asano et al. | ................ | 363/98 |
| 6,859,702 B2 * | 2/2005 | Kawashima et al. | ............ | 701/37 |
| 2002/0097016 A1 * | 7/2002 | Tanaka et al. | ................ | 318/560 |
| 2002/0191419 A1 * | 12/2002 | Asano et al. | ................ | 363/17 |
| 2005/0029973 A1 * | 2/2005 | Uno et al. | ................ | 318/254 |

OTHER PUBLICATIONS

Togashi, et al., Study on Hydraulic Active Engine Mount, SAE Technical Paper Series, May 2003, 2003-01-1418, SAE Int'l, Warrendale, PA, USA.
Matsuoka, et al., NV Countermeasure Technology for a Cylinder-on-Demand Engine, SAE Technical Paper Series, Mar. 2004, 2004-01-04, SAE Int'l, Warrendale, PA, USA.

* cited by examiner

Primary Examiner — Paul Ip

(57) ABSTRACT

A control circuit for an active engine mount is provided, including an electrical bridge circuit, and a pulse-width modulation ('PWM') circuit. The PWM circuit receives an input signal from a controller, and generates first and second PWM output signals. The first PWM signal, derived from the input signal, controls first and third switches of the electrical bridge circuit. The second PWM signal comprises a digitally inverted signal of the first PWM signal, and controls second and fourth switches of the electrical bridge circuit. First and second outputs of the bridge circuit are connectable to first and second terminals of the mount device. The controller receives an input signal from crank and cam sensors, as part of the control scheme.

18 Claims, 2 Drawing Sheets

METHOD AND APPARATUS FOR CONTROLLING AN ACTIVE ENGINE MOUNT

TECHNICAL FIELD

This invention pertains generally to engine mounting systems, and more specifically to a device and method for controlling an active engine mount.

BACKGROUND OF THE INVENTION

Designers and engineers provide engine mounts to support the engine and powertrain, and to isolate vibration forces to and from the engine. Engine mounts act to dampen vibrational forces from reciprocating masses in an engine, e.g. a crankshaft, and minimize propagation of vibration from the engine, typically 30-200 Hz, to an engine cradle and chassis. Engine mounts also act to minimize force inputs from the chassis to the engine, e.g. those caused by road surface irregularities, typically less than 30 Hz. Engine mounts serve to isolate the engine from the chassis to improve vehicle driveability, improve customer satisfaction, and improve durability of the engine, the engine mounting system, and the chassis in which the engine is mounted. Mounting devices and systems are often designed to dampen vibrations at specific frequencies, e.g. wherein vibrational inputs may be most severe or most objectionable to an operator. The introduction of displacement-on-demand engine systems introduces new vibrational inputs to the engine mount and vehicle system, due to operating an engine with a bank of cylinders deactivated. There is a change in engine operating characteristics and vibrational frequencies with a change in the number of operating cylinders. Thus, displacement-on-demand engine systems introduce new challenges to the ability of an engine mounting system to control engine vibration.

Conventional passive automotive vehicle powertrain mounts comprise some combination of mass-spring-damper optimized to provide dynamic stiffness and isolation at a key vibrational frequency, while providing less acceptable damping at other frequencies. Conventional mounts exist in many variations and generally operate to provide engine vibration isolation while controlling engine motion with respect to the vehicle frame or body structure.

An exemplary hydraulic mount assembly presently available combines properties of elastomeric materials with hydraulic fluid, and typically includes a reinforced, hollow rubber body that is closed by a resilient diaphragm so as to form a cavity. The cavity is separated into two chambers by a plate. The chambers are in fluid communication through a relatively large central orifice in the plate. A first or primary chamber is formed between the partition plate and the body. A secondary chamber is formed between the plate and the diaphragm. The conventional hydraulic mount assembly may contain a decoupler positioned in the central orifice of the plate that reciprocates in response to vibrations. The decoupler movements accommodate small volume changes in the two chambers. At certain small input vibratory amplitudes and high frequencies, fluid flow between the chambers is substantially avoided and hydraulic damping does not occur. In this manner, the decoupler functions as a passive tuning device.

Engine mount designers have sought to introduce active vibrational tuning devices, wherein an engine mount device includes internal mechanisms to control fluid flow between the chambers in the mount, thus changing dynamic stiffness and other damping characteristics of the mount. Electronic control of the mount is added to be operable to sense vehicle operating conditions, and respond thereto. Such devices often require expensive control mechanisms to effectively operate the device, thus limiting their applicability to high-end vehicle systems.

One such active engine mount device comprises a rubber body with molded in mounting structures, containing fluid and electromagnetic components comprising an electromagnet and piston. The electromagnetic components are driven by external electrical circuits, and when activated, are operable to generate repetitive motion to counteract motion of the engine, thus canceling engine forces from rotational motion. This effectively results in changing the mount stiffness at a specific frequency and therefore changing damping characteristics of the mount at that frequency. Typically, the frequency of interest is the engine cylinder firing frequency. Currently active mount devices are driven with a single-polarity pulse-width modulated signal, which is able to provide a level of vibrational damping.

What is needed is a control scheme for an active mount device which addresses the problems discussed hereinabove, to extend the vibrational damping capability of the active mount device, in order to more effectively dampen engine vibration and provide effective damping in the range of frequencies in which the engine is operating. Extending the range of frequencies over which an active mount device operates is important, especially in conjunction with the use of a displacement-on demand internal combustion engine.

SUMMARY OF THE INVENTION

The present invention provides an improvement over conventional control circuits for active engine mount devices by providing an electrical bridge circuit electrically operably connectable to the active mount device, and a pulse-width modulation ('PWM') circuit. The PWM circuit receives an input signal from a controller, and generates first and second PWM output signals. The first PWM signal is derived from the input signal from the controller, and is signally connected to a first input and a third input of the electrical bridge circuit. The second PWM signal comprises a digitally inverted signal of the first PWM signal, and is signally connected to a second input and a fourth input of the electrical bridge circuit.

Another aspect of the invention comprises the second output signal generated substantially simultaneously with the first output signal.

Another aspect of the invention comprises the active mount having a first and a second end, wherein the first end is operably mechanically attached to an internal combustion engine; and the second end is operably mechanically attached to an engine cradle.

Another aspect of the invention comprises the controller signally attached to at least one sensor of the internal combustion engine.

Another aspect of the invention comprises the input signal from the controller determined by the controller based upon a signal input from the at least one sensor of the internal combustion engine, including a crank sensor, and further including a cam sensor.

Another aspect of the invention comprises the electrical bridge circuit, wherein a first output of the electrical bridge circuit is electrically connectable to a first terminal of the active mount device, and a second output of the electrical bridge circuit electrically connectable to a second terminal of the active mount device.

Another aspect of the invention comprises the electrical bridge circuit having a first leg, and a second leg, wherein the first leg and second leg are connected in parallel, and, each electrically connecting an operating system electrical potential and an electrical ground. Furthermore, the first leg comprises first and fourth switch devices electrically connected in series at a first node, the first node comprising the first output of the electrical bridge circuit electrically connectable to the first terminal of the active mount device. Furthermore, the second leg comprises second and third switch devices electrically connected in series at a second node, the second node comprising the second output of the electrical bridge circuit electrically connectable to the second terminal of the active mount device.

Another aspect of the invention comprises the first PWM output signal operable to control the first switch device of the first leg and the third switch device of the second leg.

Another aspect of the invention comprises the second PWM output signal operable to control the second switch device of the second leg and the fourth switch device of the first leg.

Another aspect of the invention comprises root-mean squared electrical potential between the first node and the second node is substantially equal to the operating system electrical potential.

Another aspect of the invention comprises the internal combustion engine being a displacement-on-demand internal combustion engine.

Another aspect of the invention comprises a control system for a mount device for a displacement-on-demand internal combustion engine.

Another aspect of the invention comprises an apparatus for controlling for an active mount device.

Another aspect of the invention comprises a method for controlling an active mount device with a pulse-width modulation circuit signally connected to an electrical bridge circuit electrically operably connectable to the active mount device.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which will be described in detail and illustrated in the accompanying drawings which form a part hereof, and wherein.

DETAILED DESCRIPTION OF THE EMBODIMENT

Figure 1:
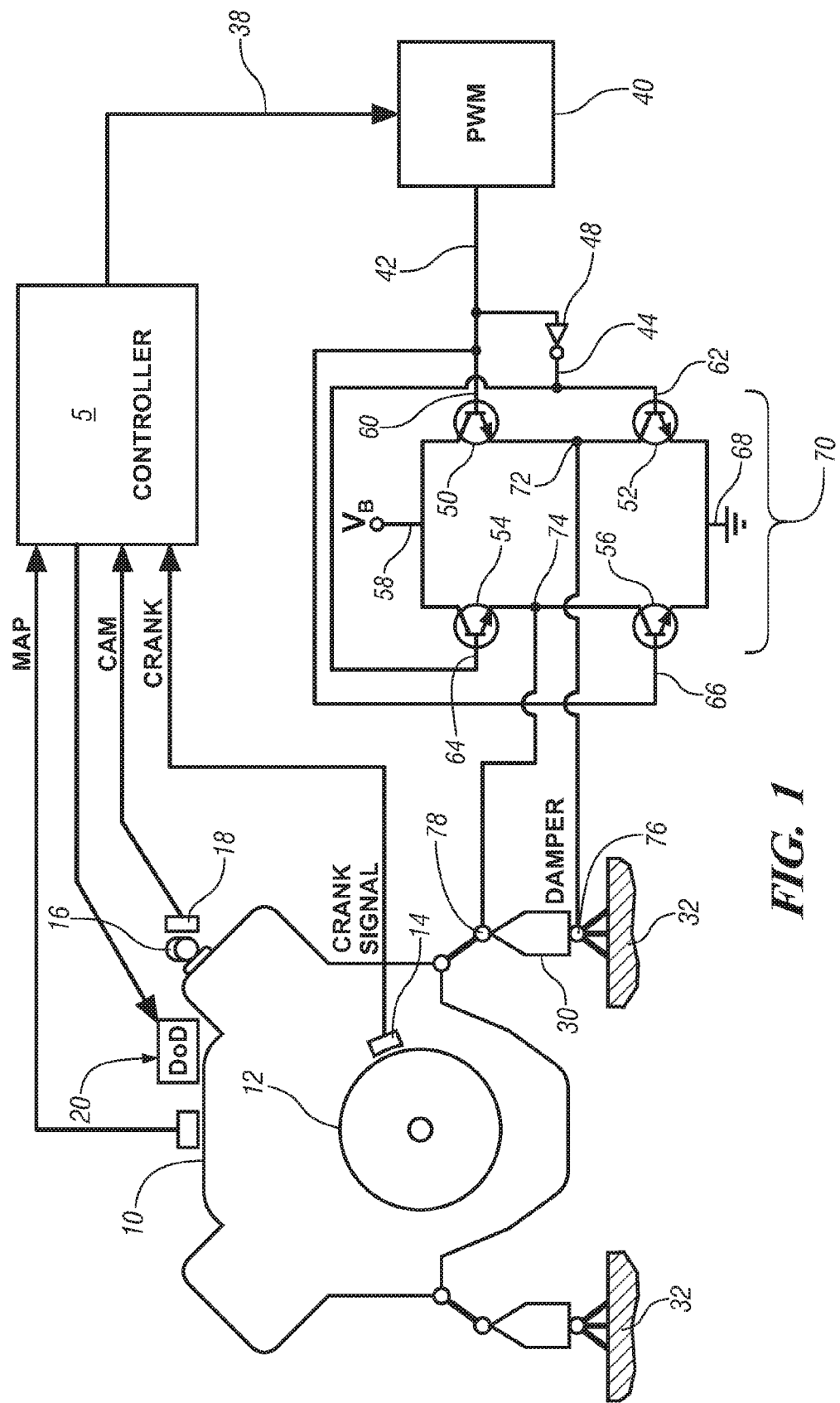
FIG. 1 is a schematic diagram of a circuit for controlling an active mount device, in accordance with the present invention; and, FIG. 2 is an output signal, in accordance with the present invention.

Referring now to the drawings, wherein the showings are for the purpose of illustrating the invention only and not for the purpose of limiting the same, FIG. 1 shows an internal combustion engine and control system which has been constructed in accordance with an embodiment of the present invention.

The exemplary engine and control system comprises a conventional four-cycle internal combustion engine 10 controlled by an electronic controller 5. The engine 10, shown in a V-configuration, includes a plurality of reciprocating pistons attached to a crankshaft 12, which is operably attached to a vehicle driveline. The engine has at least one camshaft 16, operably connected to the crankshaft 12 via a driveline chain, or belt, which is operable to control opening and closing of engine valves (not shown). The exemplary engine 10 has a crank sensor 14 operable to monitor rotational position of the crankshaft 12, and a cam sensor 18 operable to monitor rotational position of the camshaft 16. The exemplary engine has a manifold absolute pressure ('MAP') sensor 22, operable to measure manifold pressure, and hence, engine load. The engine may include a displacement-on-demand (DoD) system 20, controllable by the engine controller 5, which is operable to deactivate specific engine cylinders, e.g. all engine cylinders on one of the banks of the V-configuration.

The engine 10 is preferably mounted in an engine cradle 32 using a plurality of engine mounts. There is at least one controllable anti-vibration mount device 30 mechanically attached between the engine cradle 32 and the engine 10, preferably perpendicular to an axis defined by longitudinal axis of the engine crankshaft 12. The mount 30 is attached between the engine 10 and cradle 32 in a manner that allows the mount 30 to dampen vibration resulting, at least in part, from crankshaft rotation during engine operation. A skilled practitioner is able to effectively locate and mount the engine 10 in the cradle 32 using engine mounts, including controllable or active anti-vibration mount devices 30.

The exemplary active, controllable anti-vibration mount 30 comprises a pair of rigid, opposed mounting structures joined by a hollow elastomer body. The elastomer body defines a pair of fluid chambers linked by a controllable fluid passageway. Contained within the body is fluid, comprising a mixture of water and ethylene glycol, other forms of antifreeze fluid, or a silicon fluid. The mount 30 includes an electromagnetic actuator having an electrically controlled electromagnet and a piston moveable in response to an electric signal to the electromagnet (not shown in detail). There is a first electrical input 76 and a second electrical input 78 to the mount 30 to control excitation of the electromagnetic actuator, which controls effective vibrational response of the mount 30.

The action of the electromagnetic actuator pulls the fluid in one of the chambers within the body closest to the engine 10, out of the way so as to absorb movement of the engine as it moves towards the mount 30. Operational control of the actuator is intended to be in sympathy and synchronized with rotational movement of the engine 10. The two-chambered mount and inertia bounce track facilitates movement of fluid between the two chambers of the mount device 30 and acts to change magnitude of vibrational response of the mount device at a specific frequency, as tuned by the controller 5 using a control circuit for the active mount device 30.

The pair of rigid, opposed mounting structures enables attachment of the mount 30 to the engine 10 and the cradle 32. Other active mount embodiments may be similarly employed, and necessarily fall within the purview of the invention, insofar as the method and system for controlling the electromagnetic actuator is concerned. Active, controllable anti-vibration mount devices 30 are known to one skilled in the art, and not further detailed herein.

The controller 5 is preferably an electronic control module comprising a central processing unit signally electrically connected to volatile and non-volatile memory devices via data buses. The controller 5 is operably attached to sensing devices and other output devices to ongoingly monitor and control various aspects of engine and/or vehicle operation. The output devices typically include subsystems necessary for proper control and operation of the engine, including, by way of example, an air intake system, a fuel injection system, a spark-ignition system (when a spark-ignition engine is used), an exhaust gas recirculation system, and an evaporative control system. The engine sensing devices typically include devices operable to monitor engine operation, external conditions, and operator demand, including the crank sensor 14, the cam sensor 18, and the MAP sensor 22, and are signally attached to the controller 5 via wiring harnesses.

Algorithms stored in the non-volatile memory devices are executed by the central processing unit and are operable to monitor inputs from the sensing devices and execute control and diagnostic routines to control operation of the engine, powertrain, and chassis, using preset calibrations. Algorithms are typically executed during preset loop cycles, with each control algorithm executed at least once each loop cycle. Loop cycles are typically executed each 3, 6.25, 15, 25 and 100 milliseconds during engine operation. Alternatively, control algorithms may be executed in response to occurrence of an event. Use of the controller 5 to control various aspects of the internal combustion engine and vehicle chassis is well known to one skilled in the art.

Referring again to FIG. 1, the control circuit for the active mount device 30 is described in detail. The control circuit includes the controller 5, a pulse-width modulation circuit 40, and, an electrical bridge circuit 70 electrically operably connected to the active mount device 30. The pulse-width modulation circuit 40 is preferably up-integrated into the controller 5, or alternatively is a stand-alone device. In either instance, the pulse-width modulation circuit receives an analog input signal 38 from the controller 5, and generates a pair of digital outputs 42, 44 that are input to the electrical bridge circuit 70, as described hereinbelow. The first output 42 comprises a pulse-width-modulated ("PWM") output signal having a duty cycle that is derived, or generated, based upon magnitude of the analog input signal 38 from the controller 5. The first output 42 is signally connected to a first input 60 and a third input 66 of the electrical bridge circuit 70. The second output 44 comprises a digitally inverted PWM signal of the first output 42, and is simultaneously generated by passing the first PWM output signal through a digital logic inverter 48. The second output 44 is signally connected to a second input 62 and a fourth input 64 of the electrical bridge circuit 70.

Referring again to FIG. 1, the bridge circuit 70 comprises a first leg and a second leg electrically connected in parallel. Each leg electrically connects an operating system electrical potential 58, in this case vehicle system or battery voltage, designated as $V_B$, and an electrical ground 68. The first leg comprises a first switch device 50 electrically connected in series with a fourth switch device 52 at a first node 72. The first node 72 comprises the first output of the electrical bridge circuit 70 and is electrically connected to the first terminal 76 of the active mount device 30, when assembled. The second leg comprises a second switch device 54 electrically connected in series with a third switch device 56 at a second node 74. The second node 74 comprises the second output of the electrical bridge circuit 70 and is electrically connected to the second terminal 78 of the active mount device 30, when assembled. The switch devices 50, 52, 54, 56 as shown comprise NPN-type bipolar transistors of sufficient capacity to conduct electrical power to control the mount device 30. The first input 60 to the electrical bridge circuit 70 is signally electrically connected to a gate of the first switch device 50; the second input 64 is signally electrically connected to a gate of the second switch device 54; the third input 62 is signally electrically connected to a gate of the third switch device 52; and, the fourth input 66 is signally electrically connected to a gate of the fourth switch device 56. Alternatively, other switch devices may be used to similar effect, such as field-effect transistors. The bridge circuit 70 preferably includes other electrical components, not shown, to permit proper operation, as known to a skilled practitioner.

In operation, the controller 5 monitors signal inputs from the crank sensor 14 and the cam sensor 18. A skilled practitioner is able to determine a frequency and magnitude of vibrational input from the engine 10 based upon the signal inputs. The controller 5 is operable to execute an algorithm that determines amount of vibration damping required from the active mount device 30, and generates the input signal 38 that commands a level of active damping requested from the active mount device 30. The input signal 38 is converted, using the PWM circuit 40 and the bridge circuit 70, to electrical power to control the active mount device 30, to achieve the commanded damping. The bridge circuit 70 conducts sufficient electrical power to the mount device 30 via the first electrical input 76 and the second electrical input 78 to control the electromagnet contained therein, controlling fluid flow between the pair of fluid chambers, thus controlling stiffness and vibrational response of the mount 30.

In operation, when the first output 42 from the PWM circuit 40 is digitally 'high' or '1', the second output 44 from the PWM circuit 40 is digitally 'low', or '0'. In this first circumstance, switches 50 and 56 of the bridge circuit 70 are open, i.e., permitting electrical conductance, and switches 52 and 54 are closed. Therefore, electrical current flows from battery source 58, through switch 50 to node 72, through first electrical input 76 of the mount device, out second electrical input 78, through node 74, and through switch 56 to ground.

When the first output 42 from the PWM circuit 40 is digitally 'low', or '0', the second output 44 from the PWM circuit 40 is digitally 'high' or '1'. In this second circumstance, switches 52 and 54 of the bridge circuit 70 are open, i.e., permitting electrical conductance, and switches 50 and 56 are closed. Therefore, electrical current flows from battery source 58, through switch 54 to node 74, through second electrical input 78 of the mount device, out first electrical input 76, through node 72, and through switch 52 to ground. This second circumstance results in a reverse of electrical polarity through the electromagnetic actuator of the mount device 30, compared to the first circumstance described hereinabove.

Figure 2:
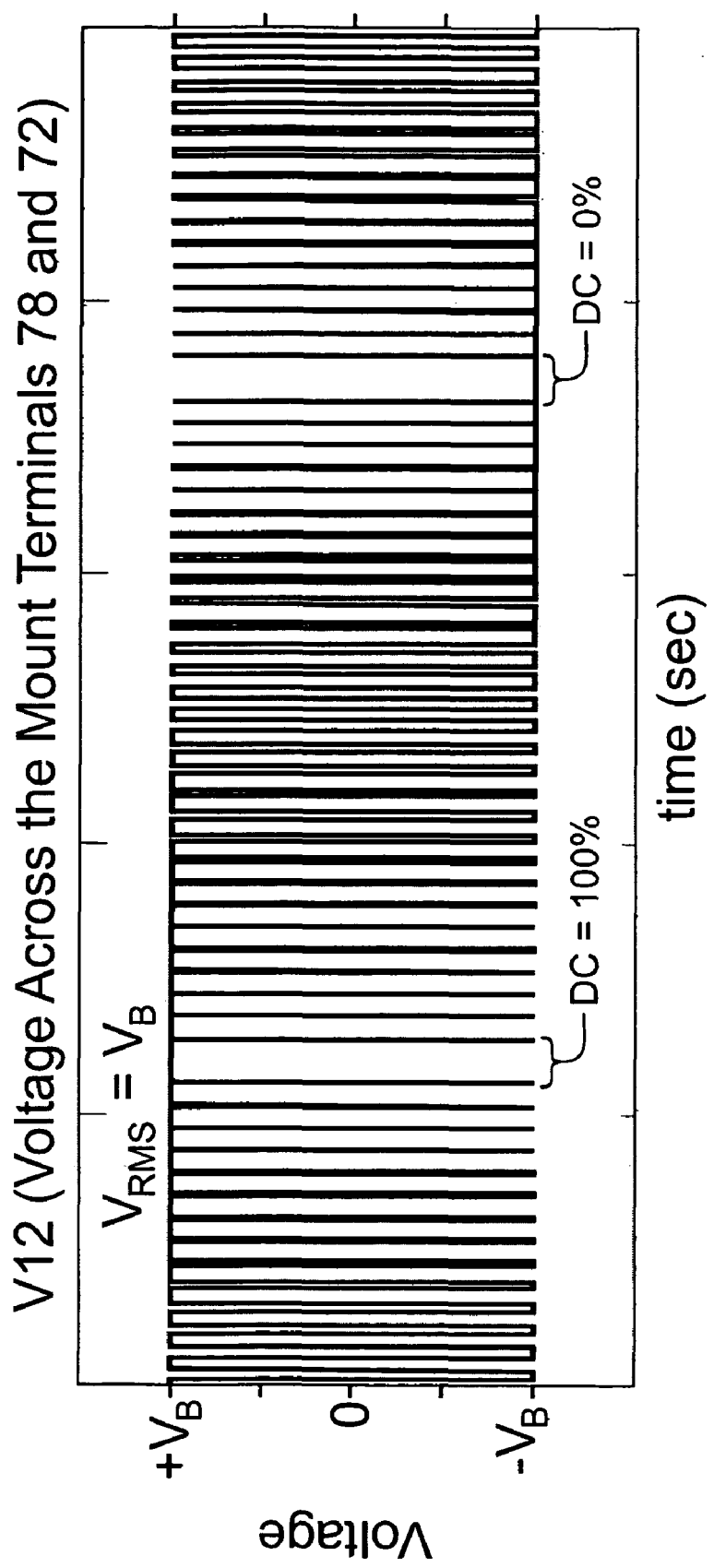

As shown with reference now to FIG. 2, measured root-mean squared electrical potential between the first node 76 and the second node 78 of the mount device 30, $V_{12}$, is substantially equal to the operating system electrical potential, $V_B$, over the range of operating PWM duty cycles, from 100% duty cycle to 0% duty cycle.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Control circuit for an active mount device, comprising:
   an electrical bridge circuit electrically operably connected to the active mount device;
   a pulse-width modulation circuit:
   configured to receive an input signal from a controller; and
   configured to generate a first pulse-width-modulated output signal derived from the input signal from the controller, and signally connected to a first input and a third input of the electrical bridge circuit; and
   an inverter circuit:
   configured to receive the first pulse-width-modulated output signal; and configured to generate a second output signal comprising an inverted signal of the first pulse-width-modulated output signal, and signally connected to a second input and a fourth input of the electrical bridge circuit.

2. The control circuit of claim 1, wherein the inverter circuit configured to receive the first pulse-width-modulated output signal and configured to generate a second output signal comprising an inverted signal of the first pulse-width-modulated output signal comprises the inverter circuit configured to generate a logically inverted pulse-width-modulated signal of the first pulse-width-modulated output signal.

3. The control circuit of claim 2, wherein the inverter circuit is configured to generate the logically inverted pulse-width-modulated signal of the first signal substantially simultaneously with the first pulse-width-modulated output signal.

4. The control circuit of claim 1, comprising: the active mount having a first end, and, a second end;
the first end mechanically attached to an internal combustion engine; and
the second end mechanically attached to an engine cradle.

5. The control circuit of claim 4, further comprising: the controller signally connected to a sensor of the internal combustion engine.

6. The control circuit of claim 5, wherein the input signal from the controller is determined by the controller in response to a signal input from the sensor of the internal combustion engine.

7. The control circuit of claim 5, wherein the sensor of the internal combustion engine comprises a crank sensor.

8. The control circuit of claim 7, wherein the sensor of the internal combustion engine further comprises a cam sensor.

9. The control circuit of claim 4, wherein the internal combustion engine comprises a displacement-on-demand internal combustion engine.

10. The control circuit of claim 1, wherein the electrical bridge circuit electrically operably connected to the active mount device comprises:
a first output of the electrical bridge circuit electrically connected to a first terminal of the active mount device; and
a second output of the electrical bridge circuit electrically connected to a second terminal of the active mount device.

11. The control circuit of claim 10, wherein the electrical bridge circuit electrically operably connected to the active mount device further comprises:
a first leg and a second leg; the first leg and second leg connected in parallel, and each electrically connecting an electrical potential and an electrical ground;
the first leg comprising first and fourth switch devices electrically connected in series at a first node, the first node comprising the first output of the electrical bridge circuit, the first switch device coupled to the electrical potential and the fourth switch device coupled to the electrical ground;
the second leg comprising second and third switch devices electrically connected in series at a second node, the second node comprising the second output of the electrical bridge circuit, the second switch device coupled to the electrical potential and the third switch device coupled to the electrical ground.

12. The control circuit of claim 11, wherein the pulse-width modulation circuit configured to generate the first pulse-width-modulated output signal signally connected to the first input and the third input of the electrical bridge circuit comprises the pulse-width-modulated circuit configured to control the first switch device of the first leg and the third switch device of the second leg.

13. The control circuit of claim 11, wherein the pulse-width modulation circuit configured to generate the second output signal signally connected to the second input and the fourth input of the electrical bridge circuit comprises the pulse-width-modulated circuit and the inverter circuit configured to control the second switch device of the second leg and the fourth switch device of the first leg.

14. The control circuit of claim 11, wherein root-mean squared electrical potential between the first node and the second node is substantially equal to the electrical potential.

15. The control circuit of claim 11, wherein the electrical potential comprises battery voltage of a vehicle.

16. Control system for an active mount device for a displacement-on-demand internal combustion engine, comprising:
a controller:
electrically signally connected to at least one engine sensor, and
configured to generate a first pulse-width-modulated output signal in response to an input from the at least one engine sensor, and,
an inverter circuit configured to generate a second pulse-width-modulated output signal comprising a logically inverted signal of the first pulse-width-modulated output signal, and
an electrical bridge circuit:
having a first leg and a second leg; the first leg and second leg connected in parallel and each electrically connecting an operating system electrical potential and an electrical ground;
the first leg comprising first and fourth switch devices electrically connected in series at a first node, the first node comprising the first output of the electrical bridge circuit, the first switch device coupled to the electrical potential and the fourth switch device coupled to the electrical ground;
the second leg comprising second and third switch devices electrically connected in series at a second node, the second node comprising the second output of the electrical bridge circuit, the second switch device coupled to the electrical potential and the third switch device coupled to the electrical ground;
the controller configured to control the first and the third switch devices using the first pulsewidth modulated output signal; and
the inverter circuit configured to control the second and fourth switch devices.

17. Method for controlling an active mount device with an electrical bridge circuit electrically operably connected to the active mount device, comprising:
receiving an input signal from a controller;
generating a first output signal derived from the input signal from the controller;
communicating the first output signal to a first input and a third input of the electrical bridge circuit;
generating a second output signal comprising a logically inverted signal of the first output signal; and
communicating the second output signal to a second input and a fourth input of the electrical bridge circuit.

18. The method of claim 17, wherein generating the first output signal comprises generating a first pulse-width-modulated output signal.

* * * * *